Nov. 7, 1944. L. H. PADDLE 2,362,153
ELECTRIC FREQUENCY CONVERTER SYSTEM
Filed Nov. 28, 1942 2 Sheets-Sheet 1

Inventor:
Leslie Harold Paddle,
by Pierce & Scheffler,
Attorneys.

Patented Nov. 7, 1944

2,362,153

UNITED STATES PATENT OFFICE 2,362,153

ELECTRIC FREQUENCY CONVERTER SYSTEM

Leslie Harold Paddle, St. Paul's Cray, England

Application November 28, 1942, Serial No. 467,245
In Great Britain December 24, 1941

13 Claims. (Cl. 172—281)

This invention relates to frequency converting systems of the kind wherein an electric current supply of one frequency is employed as an input in order that an output current of another frequency, which is or may be a sub-harmonic of the said input frequency, can be drawn from the converting system, the said converting system not involving the use of any dynamic parts.

An object of the present invention is to increase the facility of starting such systems and maintaining them in operation particularly when they are adapted to yield comparatively large outputs.

It is a further object of the invention to provide electrical frequency converting units which, per se, require no switching device or rectifier for starting up the required oscillations in their output circuits.

It is known in the art to provide an electrical network in which an impedance of non-linear type is associated with a circuit adapted to operate at a low frequency and to connect directly or indirectly such a circuit to a load or utilisation device.

Where automatically operating systems are used they may be, for example, such as are indicated in the specification of United States application No. 447,260, filed June 16, 1942.

Although the starting means described in that specification are very effective and reduce substantially and practically entirely the wear and tear on the starting contacts during the normal operation of the system, the rectifying means and other auxiliary elements of the starting devices are only active at certain periods. It is therefore a further advantage of the invention that such intermittently acting elements of the system can be reduced to a small capacity and size, even when large power units are required, and thus the cost of each apparatus is reduced.

In its broadest aspect the invention consists of an electric frequency converter system comprising a "main" unit adapted to be subject to a load having an oscillating circuit designed to maintain oscillations in its output circuit of a lower frequency than that of its input current and a "pilot" unit or source for generating or producing oscillations or impulses for the purpose of starting up or maintaining the low frequency oscillations of the "main" unit and means electrically connecting the output of the "pilot" in the circuit of the "main" unit.

In its preferred form the converter system according to the invention comprises an electric frequency converter system comprising a "main" unit designed to maintain oscillations in its output circuit of a lower frequency than that of its input current and a "pilot" unit generating or producing current of the lower frequency and means connecting the "pilot" unit to the "main" unit whereby the "main" unit can be subjected to the oscillations of the "pilot" unit for the purpose of starting or maintaining the lower frequency oscillations in the said "main" unit.

The lower frequency oscillations will usually, but not essentially, be sub-harmonics of the frequency of the input current to the "main" unit and the "pilot" unit may be either permanently in electrical connection with the "main" unit so as to be subject to the low frequency oscillations of the "pilot" unit at all times when the "pilot" unit is operating, or the arrangements may be such that the "pilot" unit is automatically connected in the "main" unit circuit by relay mechanism when the low frequency oscillations are not present, or tend to die off, in the "main" unit.

Probably the simplest example of converter systems according to the invention is that where a dynamic alternating current generator designed to produce current having the desired low frequency oscillation characteristic is employed and in such a case a relay may operate both to start up the generator and include the output from it in the circuit of the "main" unit when the low frequency oscillations are not present or die down in the "main" unit. Preferably, however, we provide a "main" unit having only frequency converting static elements and the "pilot" unit comprises frequency converting elements of smaller size together with starting up elements of known form.

The output circuit of a "pilot" unit whatever be its form is coupled, either directly or through suitable impedances, preferably to the low frequency output or other suitable point of a "main" unit which is itself unprovided with any other starting means. One of these "main" units may in its turn be arranged as an intermediate "pilot" unit for starting up a still larger unit, or alternatively, one "pilot" unit may be used solely to initiate low frequency oscillations in the output of one or more "main" units of non self-starting type. In equipments of this kind it will be appreciated that in the event of the output of one of the "main" units becoming over-loaded so as to arrest low frequency oscillation therein no damage will be done to the equipment, but as soon as the load is reduced or withdrawn the oscillations which are persistently maintained in the output circuit of the coacting "pilot" unit, will immediately re-initiate the proper working conditions in the main or converter systems.

It should be here noted that it is known in the art to arrange a system in which sub-harmonic oscillations will be set up automatically when the system is fed with a higher frequency current but in general such a system when adjusted to the best self-starting condition, is unstable under any appreciable output load. If embodied in "pilot" units, as herein set forth, such auto-starting systems are quite satisfactory as they are only subjected to the limited starting current required to initiate low frequency oscillation in the "main" units associated with them.

According to a further feature of the invention, in the output of each of the indirectly started "main" converters there may be provided a relay so controlled by the individual output that when the converter affected is in operation, the relay is energised and disconnects the associated starting "pilot" unit which may either be put out of action, be utilised for other purposes, or be left oscillating in an unloaded condition. It will be understood that such means may be applied to polyphase systems. For example, one single-phase continually operating "pilot" unit may feed (through suitable phase-adjusting networks) into the output circuits of a polyphase independently-operating main frequency-converting system of the kind described.

It may be here noted that the term "main" unit herein employed is intended to indicate the unit from which current to effect the desired operation—such as, for instance, to supply current to the ringing circuit of a telephone system—is derived and the term "pilot" unit is indicative of the unit whose prime—though not necessarily sole—purpose is to initiate or maintain the low frequency oscillations in the "main" unit. Thus in the foregoing example the intermediate unit may be regarded as a combination of the "main" and "pilot" units in that it is a "main" unit in respect of the initiating "pilot" unit of the combined system, but acts as a "pilot" for the final "main" unit.

Although the outputs of the "pilot" units hereinbefore referred to are described as coupled to the outputs of the "main" units it is within the scope of the present invention to provide couplings to the input circuits or elements associated therewith so as to initiate low frequency pulses therein for the purpose of starting up the "main" unit. Thus, low frequency windings may be formed on a non-linear inductance coil which in known manner is disposed in the supply input circuit.

Furthermore it is also contemplated according to the invention to provide as a "pilot" device means for intermittently impulsing the circuits of the "main" converting device by current which is of a periodicity which is a sub-multiple of that of the low frequency output. Such impulses may consist otherwise of intermittent damped trains of waves serving to "shock excite" the low frequency current. Such impulsing may be applied whether the "main" converter unit is working or not and would so serve continuously to "trigger" it into activity. The necessary starting impulses for the system may be set up by a "pilot" device of a dynamic type such as a rotary synchronously driven commutator or a vibratory interrupter making and breaking an appropriate direct current, alternating current or low frequency circuit and so serving to set up oscillations which are transmitted to the "main" unit either directly or through suitable impedance or coupling elements.

Whilst a primary application of apparatus according to the invention is to such cases as telephonic ringing systems and other signalling arrangements, it is realised that many other applications for such devices exist, or may exist in other technical fields, for example in the operating of reciprocating, vibrating and percussive tools, in medical applications such as vibro-massage, and in humming or vibrating conveyors or screening separators particularly useful for agitating or sifting loose material.

The "pilot" unit and "main" unit may although functioning electrically in a separate manner be formed as one mechanical structure.

In the accompanying drawings various examples of the system hereinbefore described are illustrated diagrammatically. In these drawings.

Figure 1:
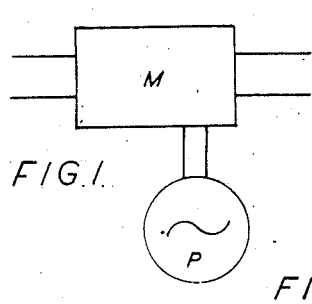
Figure 1 illustrates the case where the "pilot" unit consists of an alternating current generator.

Referring to these drawings and particularly to Figure 1, M indicates a "main" unit and P a "pilot" unit electrically connected thereto, the "pilot" unit in this case consisting of any suitable device creating or producing the oscillations or impulses for starting and maintaining the low frequency oscillations of the "main" unit. The input current may be, for example, of 60 cycles frequency and the output current 20 cycles.

Figure 2:
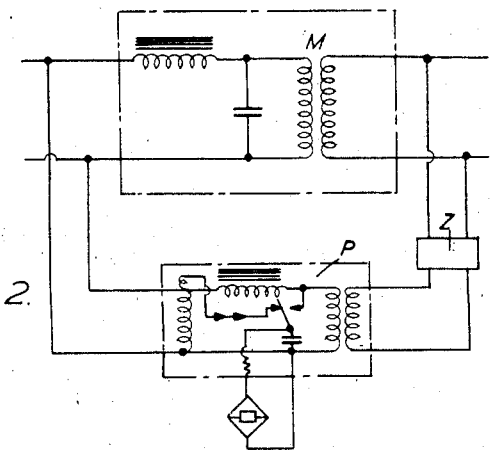
Figure 2 shows the case where the "pilot" unit consists of frequency converting elements and starting up elements of known form.

The preferred form of the invention is illustrated in Figure 2 where M again indicates the "main" unit and P the "pilot" unit. It will be seen that the "main" unit involves only frequency converting static elements whereby the frequency of the input current from mains can be converted to give a lower frequency output current according to known principles.

The "pilot" unit however includes means for starting up and maintaining the low frequency sub-harmonic oscillations the output from which "pilot" circuit is connected, preferably, through a suitable impedance Z, to the output of the "main" unit.

The arrangement and operation of the "pilot" unit is fully described in my prior application Ser. No. 447,260, suffice it to say that this "pilot" unit automatically initiates and maintains the desired low frequency or sub-harmonic oscillations which are delivered to the "main" unit to start and maintain the low frequency oscillations therein also.

Figure 3:
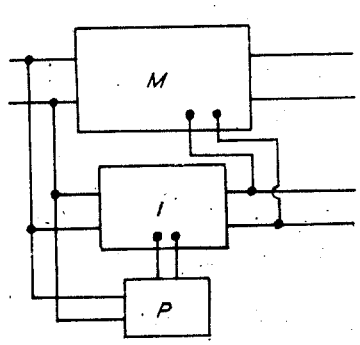
Figure 3 shows the case where an intermediate unit is employed connected between the "main" and "pilot" units.

Figure 3 indicates what may be described as a cascade arrangement where an intermediate unit I is interposed between the "main" and "pilot" units M and P respectively. In this case the low frequency oscillations are produced in the "pilot" unit P and serve to initiate and maintain the low frequency oscillations in the intermediate unit I and the output from this intermediate unit serves to initiate and maintain similar low frequency oscillations in the "main" unit M.

Figure 4:
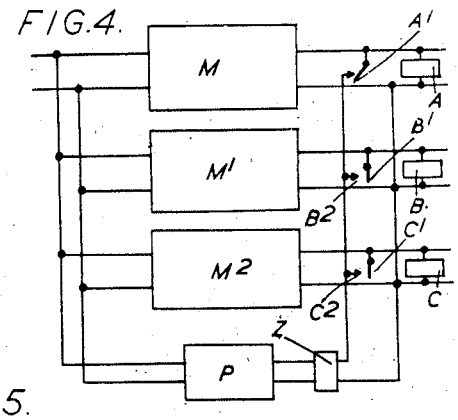
Figure 4 shows the preferred method whereby a number of "main" units can be controlled by a single "pilot" unit.

Figure 4 indicates how a number of "main" units M, M1 and M2 can all be subject to the control of a single "pilot" unit P.

The output of this "pilot" unit is connected through the impedance Z to the output circuits of all the "main" units and automatically operating relays A, B and C of known form operate to make connection with the output circuit of the "pilot" unit whenever the low frequency oscillations subside or fail. The diagram indicates that "main" units M1 and M2 are operating effectively the contact making elements B1 and C1 of the relays B and C being disengaged from the circuit contacts B2 and C2. The "main" unit M, however, is shown as having failed to maintain satisfactorily the low frequency oscillations, and as a consequence the relay A has operated to cause the contact making element A1 to establish circuit to the "pilot" unit P whereby the low frequency oscillations of the "pilot" serve to restart, or prevent total subsidence of the low frequency oscillations in the "main" unit M1.

Figure 5:
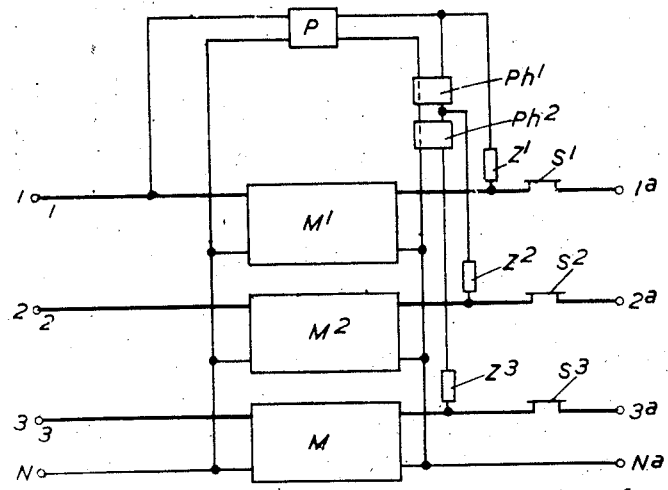
Figure 5 shows the application of the invention to polyphase frequency converting systems.

Referring to Figure 5 which illustrates the application of the invention to polyphase systems, the numerals 1, 2 and 3 indicate the line conductors and N the neutral of a high frequency three phase system while 1a, 2a, and 3a indicate the line conductors and Na the neutral of the low frequency output of the system. M1, M2 and M3 are the "main" converter units interlinking the input and output. P is the "pilot" converter unit which includes means for starting by impulsing as before described, for example, with relation to Figure 1. The output of the "pilot" unit P is connected in parallel with the input of the first "main" unit M1 and the output is coupled, for the purpose of starting the "main" converter units by way of impedance Z1 to the output of the "main" unit M1 in order to build up the desired oscillations in the latter. Ph1 is a phase changer to retard the phase of the low frequency output from the "pilot" unit P, the output of the latter being coupled for the purpose of starting, by way of impedance Z2 to the output of the second "main" converter unit M2. Ph2 is a second phase changer still further to retard the phase of the low frequency output from the "pilot" unit, the output being coupled for the purpose of starting by way of impedance Z3 to the output of the third "main converter unit M3. S1, S2 and S3 are switches which may be included to disconnect the load from the system during starting.

An essential condition to be observed in utilising systems in accordance with the invention is that, during the process of starting up a "main" unit, the magnetic flux in the core of the non-linear inductance forming part of the frequency converter system of said unit, must be brought to such a point on the magnetisation curve of the core material used, that with the additional magnetisation produced by the application of the low frequency current fed from the "pilot" unit, the core of the saturable inductance is brought to saturation, so that the resulting non-linear relationship between applied alternating voltage and current passing through the said inductance permits a current component of the low frequency to traverse the coil winding from the input source of supply and thus to initiate and maintain the low frequency subharmonic output.

If the normal flow of current from the supply mains plus the effect of the input current fed from the low frequency "pilot" does not suffice cyclically to magnetise the non-linear inductance to the appropriate value for starting the device, the maximum magnetic flux may be increased during the starting operation, either by the passing of a direct current through a winding of the said inductance, or by increasing the voltage of the alternating current input temporarily to cause the required maximum total flux to be attained.

To effect ready starting it is desirable for the "pilot" unit to be fed from the same supply mains as the "main" unit or from a source synchronised therewith in order that the sub-harmonic feed to the "main" unit may have the optimum phase relationship.

Figure 6:
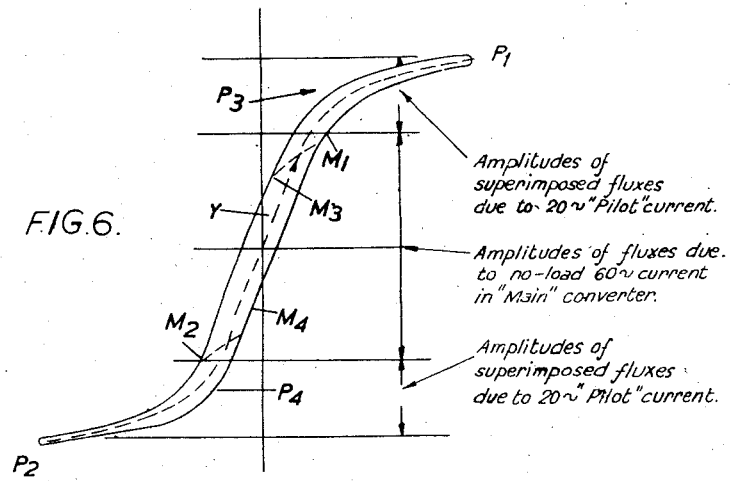
Figure 6 is a graph explanatory of an essential condition to be observed in the successful application of the invention.

Figure 6 illustrates diagrammatically, in a general manner, the relationships which may exist between the core magnetisation in the non-linear inductance due to the no-load 60 cycle "main" current and that due to the 20 cycle "pilot" current when applied in addition to the "main" current.

In referring to this figure it is assumed that with the application of the "main" current the magnetisation curve passes through points M1 and M2 as maxima with "knees" on the hysteresis curve at M3 and M4, thus the zone of magnetisation covered lies about Y as a mean.

If in addition, at a correct phase, 20 cycle "pilot" current is applied, the magnetisation extends to points P1 or P2 with abrupt "knees" at P3 and P4. The inductance exhibited by the core is no longer constant and becomes a non-linear function of the exciting current and the starting effect is consequently achieved. If the normal no-load 60 cycle current does not bring the magnetisation sufficiently high, then by increase of the applied 60 cycle voltage or by the application of a superimposed direct current which serves to bring the flux density into the neighbourhood of M1 or M2 when the normal no-load 60 cycle current is also applied the desired result, when the 20 cycle "pilot" current is provided, is again obtained.

Figure 7:
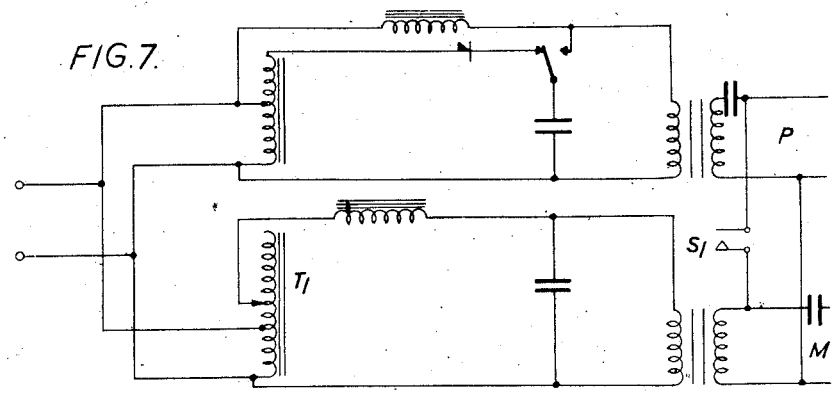
Figures 7 and 8 are diagrams explanatory of practical methods of procedure for ensuring effective starting up.
Figure 8:
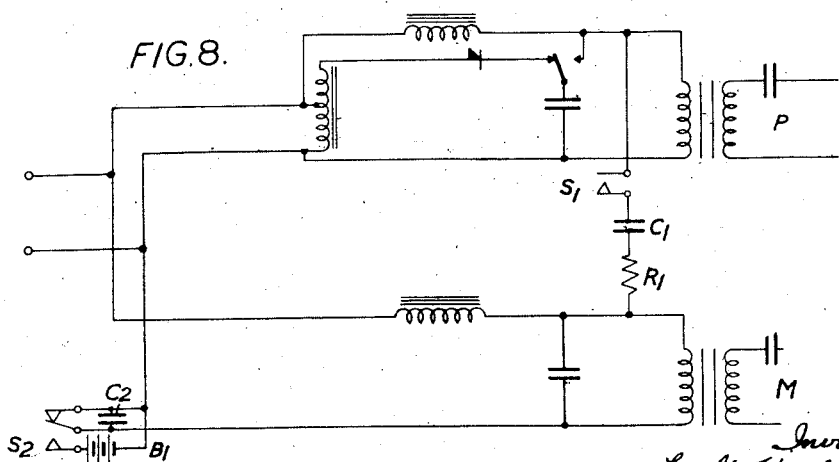

The manner in which the starting up of the apparatus is effected will be understood from a consideration of the explanatory circuit diagrams shown in Figures 7 and 8.

Referring first to Figure 7, to effect the starting connect to mains and allow the "pilot" converter P to start in the normal manner. Then close the switch S1. If the impulse given to the "pilot" converter by this operation stops the oscillations, open switch S1, and allow the "pilot" to re-start and then repeat until the "pilot" remains in operation. Under these conditions a fraction of the normal value of the 20 cycles per second voltage will appear across the tank circuit of the "main" converter, this being fed from the output of the "pilot" converter to the secondary winding of the main output transformer.

If the input voltage to "main" converter is now raised by means of the continuously variable tapping on the transformer T1, until the input voltage reaches about 2¼ times its normal value, the "main" converter jumps into oscillation at the low frequency.

The input voltage to "main" converter is then reduced to normal by means of the continuously variable tapping on transformer T1 and the starting operation has been completed. The switch S1 may then be opened if desired.

Figure 8 shows a case where direct current auxiliary excitation is made use of. Switch S2 is closed and the battery or like source B1 is connected in the circuit of the "main" converter. Direct current thus flows through the primary of the output transformer, the winding of choke and the supply terminals. The value of the current is a fraction of that sufficient to cause saturation of the choke. The action of switching on the direct current produces an added excitation of the "main" converter non-linear inductance which is sufficient to start low frequency oscillations. It should be borne in mind that the voltage of the battery is critical. If it is too low the increment of flux given is not sufficient. If it is too high it makes the operation of choke too un-symmetrical to maintain oscillations. In this case starting up is effected by connecting to the alternating current mains and allowing the "pilot" converter to start in the normal manner. The switch S1 is then closed. Under these conditions a fraction of the normal value of the 20 cycles per second voltage will appear across the tank circuit of the "main" converter, this being fed from the oscillatory circuit of the "pilot" converter with the capacity and resistance C1, R1.

The opening of switch S2 puts the battery out of circuit. A condenser C2 is included to prevent sparking and to maintain oscillations during period when switch is changing over.

Here again the switch S1 may be opened if desired when the starting has been accomplished.

It will be understood that, under the conditions mentioned with regard to Figures 7 and 8, no load should be on converters during starting operations.

What I claim and desire to secure by Letters Patent is:

1. An electric frequency converter system comprising the combination with a "main" unit adapted to be subject to a load, said unit having an oscillatory circuit including means to maintain oscillations in its output circuit of a lower frequency than that of its input current, of a "pilot" unit developing impulses for the purpose of starting up and maintaining the low frequency oscillations of the "main" unit, and means electrically connecting the output of the "pilot" unit in the circuit of the "main" unit.

2. An electric frequency converter system comprising a "main" unit adapted to be subject to a load, having an oscillatory circuit including means to maintain oscillations in its output circuit of a lower frequency than that of its input current, a substantially unloaded "pilot" unit generating or producing current of the lower frequency, and means connecting the "pilot" unit to the "main" unit, whereby the "main" unit can be subjected to the oscillations of the "pilot" unit for starting up or maintaining the lower frequency oscillations in the said "main" unit.

3. An electric frequency converter system according to claim 2, wherein the "main" unit comprises only frequency converting static elements, and the "pilot" unit comprises frequency converting elements and starting elements of known form for initiating or maintaining the low frequency oscillations in the "pilot" unit.

4. An electric frequency converter system according to claim 2, wherein the "pilot" unit consists of a dynamic device for generating alternating current of the desired low frequency of oscillation.

5. An electric frequency converter system according to claim 2, wherein the "pilot" unit has an output circuit connected to the output circuit of the "main" unit.

6. An electric frequency converter system according to claim 1, wherein the means connecting the "pilot" unit to the "main" unit includes an intermediate unit.

7. An electric frequency converter system according to claim 1, wherein the "pilot" unit is permanently connected in circuit with the "main" unit.

8. An electric frequency converter system according to claim 1, wherein said electrically connecting means includes switch means automatically connecting said "pilot" unit in circuit with a "main" unit when the low frequency oscillations in the "main" unit cease or tend to cease whereby said low frequency oscillations in the "main" unit are started up or maintained.

9. In an electric frequency converter system, the combination with a plurality of "main" units adapted to be subject to load and each including an oscillatory circuit having means for developing an output current of a lower frequency than its input current, of means for initiating and maintaining the development of said output currents of relatively low frequency; said last means comprising a "pilot" unit producing impulses of the desired low frequency, and means for electrically connecting said "pilot" unit to said "main" units to subject said "main" units to the low frequency impulses of the "pilot" unit.

10. An electric frequency converter system as recited in claim 9 wherein said electrically connecting means includes an impedance.

11. An electric frequency converter system as recited in claim 9, in combination with switch means for removing the loads from said "main" units during the initiation of the development of low frequency output currents by said "main" units.

12. An electric frequency converter system as recited in claim 9, wherein said "main" units develop low frequency output currents in polyphase relation, and said electrically connecting means includes a phase-shifting network for maintaining the desired phase relationship of said output currents.

13. An electric frequency converter system as recited in claim 1, wherein said means of the oscillatory circuit is a non-linear impedance, in combination with means for temporarily increasing the current flow through said non-linear element during the starting up of the "main" unit of the frequency converter.

LESLIE HAROLD PADDLE.